C. A. BEARDMORE.
LIQUID LEVEL GAGE FOR AUTOMOBILE RADIATORS.
APPLICATION FILED JAN. 28, 1920.
1,386,833.
Patented Aug. 9, 1921.
2 SHEETS—SHEET 1.
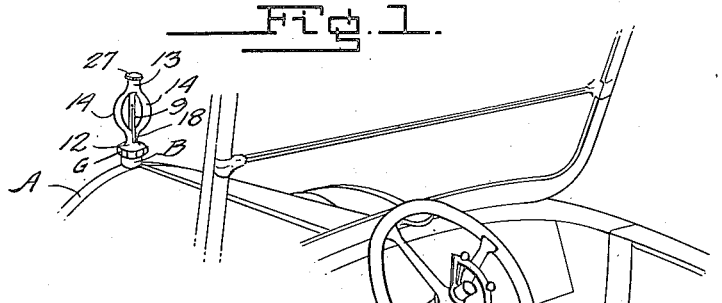
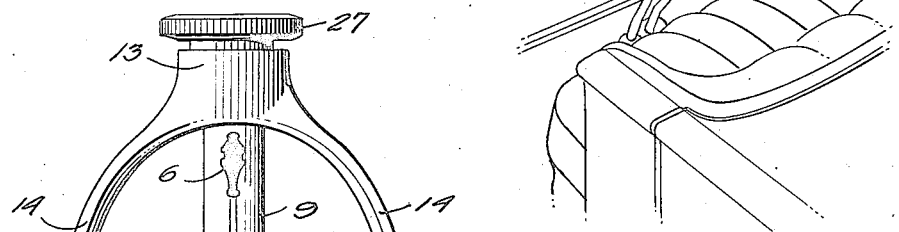
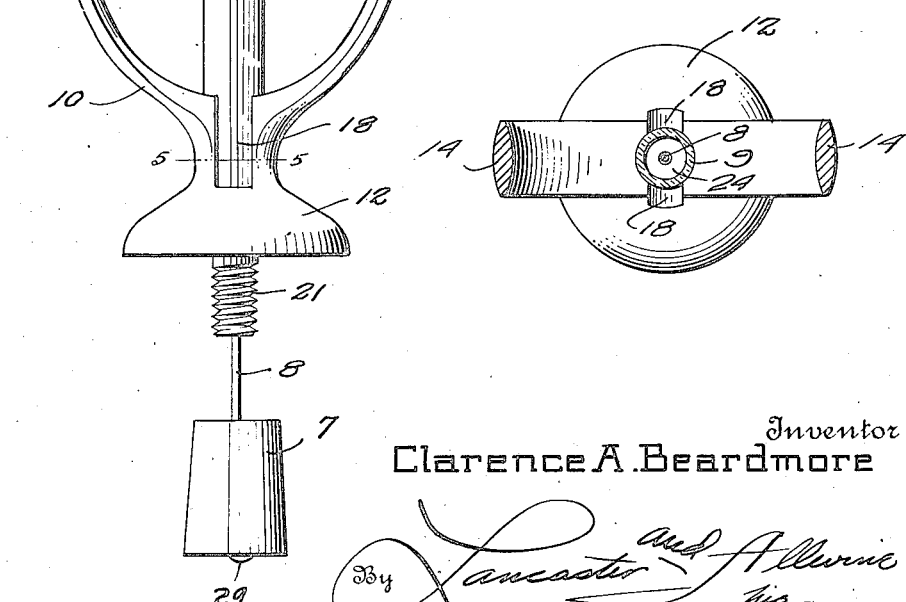
Inventor
Clarence A. Beardmore

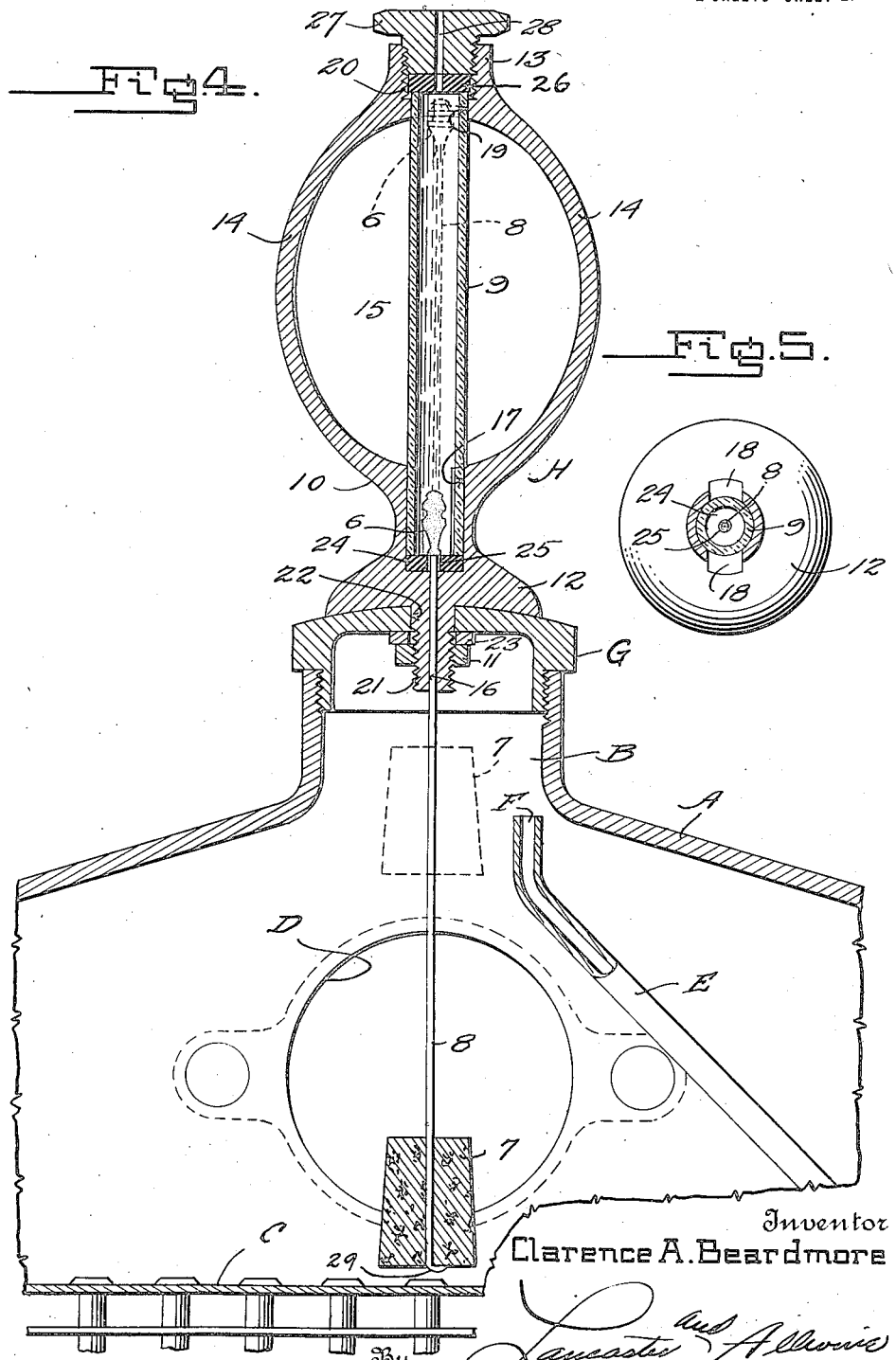

UNITED STATES PATENT OFFICE.

CLARENCE A. BEARDMORE, OF ANNAPOLIS, MARYLAND, ASSIGNOR OF ONE-HALF TO WINSON G. GOTT, OF ANNAPOLIS, MARYLAND.

LIQUID-LEVEL GAGE FOR AUTOMOBILE-RADIATORS.

1,386,833.     Specification of Letters Patent.     Patented Aug. 9, 1921.

Application filed January 28, 1920. Serial No. 354,543.

*To all whom it may concern:*

Be it known that I, CLARENCE A. BEARDMORE, a citizen of the United States, residing at Annapolis, in the county of Anne Arundel and State of Maryland, have invented certain new and useful Improvements in Liquid-Level Gages for Automobile-Radiators, of which the following is a specification.

My present invention relates to gages and more particularly to such as used on radiators forming a part of the cooling system of internal combustion engines.

One of the principal objects of my invention is to provide a gage which may be carried by the radiator cap or mounted upon the radiator, and embodying an indicator which is readily visible from practically any angle and particularly by occupants of the automobile and when approaching it from the front, so that a leakage of or insufficient liquid in the radiator may be readily discerned and trouble averted by replenishing the supply. In this connection it is pointed out that leakage of the liquid frequently takes place while motoring, due to the release of packing about the pump shaft, as when the gland works loose, and the loss of the cooling medium is not ordinarly noted until the engine has become heated to that extent where parts are damaged or it is dangerous to add cold water without permitting the engine to cool. By the use of a gage constructed according to my invention the fall of the liquid level may be readily discerned while the automobile is in motion, in the event of leakage and steps taken to make adjustment or repairs and replenish the supply at the most opportune time, the indicator being at all times in the line of vision of the occupants of the vehicle.

Another object of my invention is to provide a gage embodying a vertically movable indicator and glass incasement therefor and a protector for the incasement so shaped and constructed as to make the indicator visible throughout its sphere of movement and yet not render the incasement likely to breakage due to vibration or casual forces coming thereupon.

A further object of the invention is to provide a gage which may be adapted for use with various size and styles of radiators so that adjustment or assemblage may be accomplished to attain the best results in which connection it is stated that the gage includes a buoyant body which rises and falls with the liquid and actuates the indicator, this buoyant body being adjustable with respect to the indicator so that, in assemblage into operative relation to a particular radiator, the buoyant body may be adjusted so as to be disposed above the usual liquid inlet of the radiator when the indicator is at its highest point, where the buoyant body will be least disturbed by the circulating liquid, but which drops into the current when the liquid supply is diminished and causes the indicator to become more active or reciprocate due to the disturbance of the buoyant body in the circulating liquid. This more efficiently discloses the diminished supply especially when motoring.

A still further object of the invention is to provide a gage which is simple in construction and hence inexpensive to manufacture and assemble, and which is neat in apearance.

Other objects and advantages of the invention will appear in the following detailed description, taken in connection with the accompanying drawings, forming a part of this specification and in which drawings:

Figure 1 is a fragmentary perspective view of an automobile equipped with a gage embodying my invention.

Fig. 2 is an elevation of the gage.

Fig. 3 is a sectional view on the line 3—3 of Fig. 2.

Fig. 4 is a central vertical sectional view through the gage and parts of an automobile radiator disclosing an assembling particularly well adapted to attain good results.

Fig. 5 is a sectional view on the line 5—5 of Fig. 2.

A designates the head of an automobile radiator provided with a filler mouth B and bottom C spaced therebelow, a liquid inlet D opening into the rear of this head as is usual, there being an over flow pipe E shown which is also usually provided in radiators with its ingress F at approximately the lower portion of the filler mouth; G, a cap for the mouth B; and H the gage mounted upon the cap G.

The gage H comprises an indicator 6 which may be black or of a distinct color from the remainder of the gage; a buoyant body 7 such as a cork treated so as to not become water-logged; a rod 8 connecting the indicator and buoyant body, the latter being preferably adjustable on the rod as by its telescopic engagement therewith; a transparent incasement 9 for the indicator; and a main body portion 10, supporting the parts and adapted for connection to the cap G as by a nut 11.

The main body portion 10 may comprise a base 12, a head 13, and oppositely disposed connections 14 between the base and head, thus providing a relatively large sight opening 15 through which the line of vision may be directed. The base 12 in the example shown is provided with a vertical bore 16 opening to a recess 17 in the base, this recess being open at the top of the base and for a purpose to be subsequently set forth, may be provided with oppositely disposed sight-ways 18, these ways being in a plane at right angles to the plane of connections 14, as clearly shown in Fig. 2 of the drawing. The head 13 may be provided with a bore 19 axially alined with bore 16, screw threaded as indicated at 20. The base 12 may also be provided with a screw threaded extension 21 adapted to project through an opening 22 in the cap G, this extension 21 to receive the nut 11 in screw threaded engagement, a lock washer 23 being disposed between the nut 11 and cap in order to more securely fasten the gage to the cap.

The glass tube 9 or other transparent incasement extends between the base 12 and head 13 with its lower end portion received by recess 17 and its upper end portion extending into the bore 19. A gasket 24 may be disposed in recess 17 upon which the incasement 9 rests, this gasket provided with a bore 25 alined with bore 16. A gasket 26 may be disposed on the top of incasement 9, and screw threaded bore 19 may receive a cap 27, which bears upon gasket 26, and retains the incasement against vibration. The gasket 26 and cap 27 may be provided with a bore 28 to form a communication between the interior of the incasement and the atmosphere.

In practice it is preferred to secure the indicator 6 to the upper end portion of the rod 8, which slides in bore 16 and to adjustably support the buoyant body 7 at the lower portion of the rod. Thus, in assemblage, the gasket 24 is first disposed in the lower portion of recess 17; the incasement 9 is then moved downwardly through the bore 19 so that its lower end portion is disposed in recess 17 and upon gasket 24; the rod 8, with the buoyant body removed therefrom is then slid downwardly through the incasement 9, through bore 16 until the indicator 6 is disposed within the incasement; the gasket 26 is then disposed in place, and the cap 27 turned into place until the gaskets 24 and 26 are slightly compressed securely retaining the incasement in operative relation to the main body portion 10. The buoyant body 7 may then be disposed on the lower end portion of rod 8 and in order to adapt the indicator to the particular radiator on which it is to be used, the distance between the inlet of overflow pipe E with respect to the lower portion of cap D may be approximately measured, and with the indicator 6 engaging the gasket 26, the buoyant body 7 may be adjusted on rod 8, as by sliding it longitudinally of the rod, until it is centered at approximately the distance below cap G equal to the measurement taken as hereinbefore described and then bending laterally the end of the rod as indicated at 29. Thus, in use, when the radiator is filled to that extent where the water assumes a level with the intake of overflow E, the buoyant body 7 will be raised to that extent where it will dispose the indicator 6 at the extreme upper portion of the incasement 9, thus indicating high water level. As the buoyant body 7 descends, due to a reduced liquid supply, the indicator 6 will be moved accordingly and when the motor is in operation, if the buoyant body 7 is disposed in the path of the circulating cooling medium issuing from inlet D it will be disturbed in such a manner as to actuate the indicator and more readily bring to the attention of observers, the approximate liquid level in the radiator.

It is to be observed that even though the indicator 6 assumes the extreme lower position shown in Fig. 4 of the drawings, thus indicating low liquid level or absence of liquid in the radiator head, this indicator will still be visible through the sight ways 18 hereinbefore described, yet the glass tube or transparent incasement is amply protected at its lower end portion by the embracing portions of the base 12.

Changes in details may be made without departing from the spirit or scope of my invention; but,

I claim:

1. In combination with a radiator head having a liquid inlet opening into its wall, of a gage including an indicator, a buoyant body in said radiator movable in the current of liquid delivered through said inlet to be disturbed laterally and vertically thereby and movable above said inlet, and a device operatively connecting said buoyant body and indicator to actuate the latter by movement and disturbance of the former, said indicator arranged to indicate high liquid level in the radiator when said buoyant body is above said inlet.

2. In combination with a radiator head having a liquid inlet opening into its wall, of a gage including a vertically movable indicator, a buoyant body in said radiator movable in the current of liquid delivered from said inlet to be disturbed laterally and vertically thereby and movable above said inlet, and a vertically slidable rod connecting said buoyant body and indicator to actuate the latter by movement and disturbance of the former, said indicator arranged to indicate high liquid level in the radiator when said buoyant body is above said inlet opening.

3. In a gage for radiators, the combination of a main body portion comprising a base, a head axially alined therewith and spaced connections between said base and head, said base provided with a vertical bore and a recess open at its top, and said head provided with a vertical bore co-axial with said recess; a glass tube disposed with its lower end portion in said recess and its upper end portion in said bore of said head; a removable cap in said bore above said tube; an indicator movable in said tube; a buoyant body below said main body portion; and a rod connecting said indicator and buoyant body and slidable in said bore of said base.

4. In a gage for radiators, the combination of a main body portion comprising a base, a head, axially alined therewith and spaced arcuate connections between said base and head, said base provided with a vertical bore and a recess open at its top, and said head provided with a vertical bore co-axial with said recess; a glass tube disposed with its lower end portion in said recess and its upper end portion in said bore of said head; a removable cap in said bore above said tube; an indicator movable in said tube; a buoyant body below said main body portion and a rod connecting said indicator and buoyant body and slidable in said bore of said base.

5. In a gage for radiators, the combination of a main body portion comprising a base, a head axially alined therewith, and spaced connections between said base and head, said base provided with a vertical bore and a recess open at its top, and said head provided with a vertically screw threaded bore, a glass tube disposed with its lower end portion in said recess and its upper end portion in said bore of said head, a gasket between said tube and the base of said recess, a gasket mounted upon said tube, a cap in screw threaded engagement with the bore of said head and bearing upon said gasket, an indicator movable in said tube; a buoyant body below said main body portion; and a rod connecting said indicator and buoyant body and slidable in said bore of said base.

6. In a gage for radiators, the combination of a main body portion comprising a base, a head axially alined therewith, and oppositely disposed arcuate connections between said base and head, said base provided with a circular recess open at its top and diametrically disposed vertical sight-ways open to said recess, said sight-ways in a plane at right angles to the plane of said spaced connections, whereby the line of vision may be directed through said base, a glass tube extending between said head and base and having its lower end portion disposed in said recess, an indicator movable between said base and head in said tube, a buoyant body, and a device operatively connecting said buoyant body and indicator to impart movement of the former to the latter.

CLARENCE A. BEARDMORE.